US010374802B2

(12) United States Patent
McCallum

(10) Patent No.: US 10,374,802 B2
(45) Date of Patent: Aug. 6, 2019

(54) MULTI-FACTOR SIMPLE PASSWORD EXPONENTIAL KEY EXCHANGE (SPEKE) AUTHENTICATION

(71) Applicant: Red Hat, Inc., Raleigh, NC (US)

(72) Inventor: Nathaniel McCallum, Nicholasville, KY (US)

(73) Assignee: Red Hat, Inc., Raleigh, NC (US)

( * ) Notice: Subject to any disclaimer, the term of this patent is extended or adjusted under 35 U.S.C. 154(b) by 200 days.

(21) Appl. No.: 14/950,726

(22) Filed: Nov. 24, 2015

(65) Prior Publication Data

US 2017/0070497 A1     Mar. 9, 2017

Related U.S. Application Data

(60) Provisional application No. 62/152,217, filed on Apr. 24, 2015.

(51) Int. Cl.
*H04L 9/32*     (2006.01)

(52) U.S. Cl.
CPC .......... *H04L 9/3226* (2013.01); *H04L 9/3228* (2013.01); *H04L 9/3231* (2013.01); *H04L 9/3236* (2013.01)

(58) Field of Classification Search
CPC ....... H04L 63/083; H04L 9/3226; H04L 9/08; H04L 9/0861; H04L 9/0863; H04L 9/0866; H04L 9/3228; H04L 9/3231; H04L 9/3236
See application file for complete search history.

(56) References Cited

U.S. PATENT DOCUMENTS

| 6,226,383 | B1* | 5/2001 | Jablon | H04L 9/0844 380/30 |
|---|---|---|---|---|
| 7,139,917 | B2 | 11/2006 | Jablon | |
| 8,162,211 | B2 | 4/2012 | Adams et al. | |
| 8,316,416 | B2 | 11/2012 | Brown et al. | |
| 8,424,760 | B2 | 4/2013 | Adams et al. | |
| 8,443,194 | B2 | 5/2013 | Liu et al. | |
| 8,776,176 | B2 | 7/2014 | Stebilla et al. | |
| 9,467,293 | B1* | 10/2016 | Brainard | G06Q 20/3823 |
| 2003/0037237 | A1 | 11/2003 | Abgrall et al. | |
| 2004/0158714 | A1* | 8/2004 | Peyravian | H04L 9/0825 713/171 |

(Continued)

FOREIGN PATENT DOCUMENTS

GB     2440358 B2     4/2009

OTHER PUBLICATIONS

Multi-Factor Password-Authenticated Key Exchange, Douglas Stebila (Year: 2009).*

(Continued)

*Primary Examiner* — Alexander Lagor
*Assistant Examiner* — Vu V Tran
(74) *Attorney, Agent, or Firm* — Lowenstein Sandler LLP

(57) ABSTRACT

A method relates to receiving, by a processing device of an authentication server over a public network, an authentication request from a client device, the authentication request comprising a user identifier associated with first factor data, in which the first factor data comprises a password stored in a storage associated with the authentication server, calculating a generator value in view of the first factor data and a second factor data associated with the user identifier, and generating a session key in view of the generator value and a first public key received from the client device.

17 Claims, 5 Drawing Sheets

(56) References Cited

U.S. PATENT DOCUMENTS

| | | | | |
|---|---|---|---|---|
| 2005/0268107 A1* | 12/2005 | Harris | ............... | G06F 21/31 |
| | | | | 713/182 |
| 2007/0014407 A1* | 1/2007 | Narendra | ............ | G06F 21/32 |
| | | | | 380/259 |
| 2012/0082312 A1* | 4/2012 | Liu | ............... | H04L 9/0844 |
| | | | | 380/262 |
| 2014/0164768 A1 | 6/2014 | Kruglick | | |
| 2014/0237246 A1* | 8/2014 | Brown | ............ | H04L 63/062 |
| | | | | 713/171 |
| 2016/0248752 A1* | 8/2016 | Blinn | ............ | H04L 63/083 |

OTHER PUBLICATIONS

Three-factor control protocol based on elliptic curve cryptosystem for universal serial bus mass storage devices (Year: 2012).*

Hao, Feng and Ryan, Peter, "J-PAKE: Authenticated Key Exchange Without PKI", Thales E-Security, Cambridge, UK; Facutly of Science, University of Lusembourg, 24 pages https://eprint.iacr.org/2010/190.pdf (Last accessed Jan. 7, 2016).

Jablon, David P., "Extended Password Key Exchange Protocols Immune to Dictionary Attack",, Integrity Sciences, Inc., WET-ICE '97 Enterprise Security, IEEE Computer Society, Cambridge, MA, Jun. 18, 1997, pp. 248-255.

Ricciardi, Fulvio, "Kerberos Protocol Tutorial", National Institure of Nuclear Physics Computing and Network Services, Lecce, Italy, Nov. 27, 2007, 10 pages http://www.kerberos.org/software/tutorial.html.

"2-Factor Authentication for Mobile Applications: Introducing DoubleSec", DSwiss Ltd. Technology Whitepaper, Init Insitute of Applied Information Technology, V1.0, Jun. 2010 9 pages.

* cited by examiner

MULTI-FACTOR SIMPLE PASSWORD EXPONENTIAL KEY EXCHANGE (SPEKE) AUTHENTICATION

RELATED APPLICATIONS

The present application claims priority from U.S. Provisional Application No. 62/152,217 filed on Apr. 24, 2015, the content of which is incorporated by reference in its entirety herein.

TECHNICAL FIELD

This disclosure relates to multi-factor authentication using key exchange and, in particular, to using multi-factor simple password exponential key exchange (SPEKE) for key encrypted authentication over a public network.

BACKGROUND

Current implementations of multi-factor authentications over public networks first use security certificates to establish an authenticated channel between the entity seeking to be authenticated and the authentication server, and then transmit multiple factors through the authenticated channel. This approach relies on a third-party to provide the security certificates to enable the authentication of the channel before additional factors may be transmitted over the authenticated channel. For example, transport layer security (TLS) and secure socket layer (SSL) are cryptographic protocols designed to provide communication security over the Internet. However, TLS and SSL methodologies rely on validation of security certificates issued by certificate authorities or use a protocol such as the DNS-based authentication of named entities (DANE). Reliance on certificate authorities has the drawback that the certificate authorities may be controlled and tempered by other entities (such as the government). Additionally, the DANE protocol may be vulnerable to phishing attacks.

BRIEF DESCRIPTION OF THE DRAWINGS

The present disclosure is illustrated by way of example, and not by way of limitation, in the figures of the accompanying drawings.

DETAILED DESCRIPTION

Multi-factor authentication is an authentication method that requires the entity seeking to be authenticated (e.g., a computer system user) to present two or more of the three basic authentication factors including a knowledge factor ("something only the user knows"), a possession factor ("something only the user has"), and an inherence factor ("something only the user is") to an authentication server over one or more communication channels. The more factors employed by the authentication process, the higher the probability that the user indeed possesses the asserted identity. Two-factor authentication is commonly employed in computer authentication, wherein the user may be required to supply a set of credentials covering the knowledge factor and the possession factor (e.g., a user password and a one-time code), or the knowledge factor and the inherence factor (e.g., a user password and a biometric input).

Instead of relying on a certificate authority to provide certificates to enable the authentication of a communication channel between a client device and an authentication server over a public network, implementations of the present disclosure use password authenticated key exchange (PAKE) approaches to establish a PAKE-key encrypted channel between the client device and the authentication server using two or more factors, thus eliminating the need to rely on security certificates issued by the certificate authorities.

Implementations of the present disclosure relate to receiving, by a processing device of an authentication server over a public network, an authentication request from a client device, the authentication request comprising a user identifier associated with first factor data, in which the first factor data comprises a password stored in a storage associated with the authentication server, calculating a generator value in view of the first factor data and a second factor data associated with the user identifier, and generating a session key in view of the generator value and a first public key received from the client device.

Implementations of the present disclosure relate to a server including a memory to store a first factor data and a second factor data and a processing device, operatively coupled to the memory, the processing device to receive an authentication request from a client device over a public network, in which the first factor data comprises a password stored in a storage associated with the authentication server, the authentication request comprising a user identifier associated with first factor data, calculate a generator in view of the first factor data and a second factor data associated with the user identifier, and, generate a session key in view of the generator and a first public key received from the client device.

Figure 1:
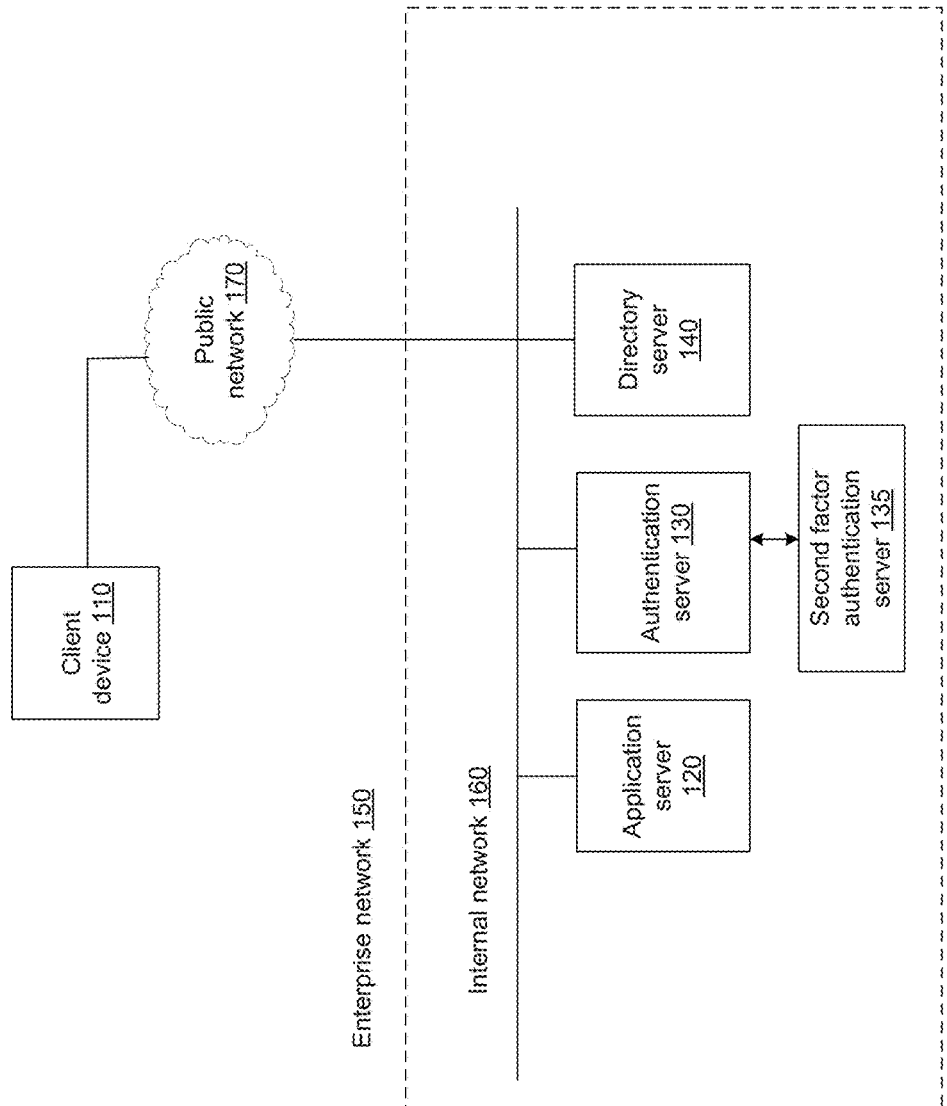
FIG. 1 illustrates a processing system to achieve multi-factor password authenticated key exchange according to some implementations of the present disclosure.

FIG. 1 illustrates a processing system 100 to achieve multi-factor password authenticated key exchange according to some implementations of the present disclosure. The processing system 100 may include one or more computer systems interconnected by one or more networks. As used herein, a "computer system" refers to a system including one or more processors, one or more memory devices, and one or more communication interfaces.

As used herein, a "processor" refers to a device capable of executing instructions encoding arithmetic, logical, or I/O operations. In one implementation, the processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A "memory device" herein shall refer to a volatile or non-volatile memory device, such as RAM, ROM, EEPROM, or any other device capable of storing data. A "communication interface" herein shall refer to circuitry or device communicatively coupled to one or more processors and capable of routing data between the processors and one or more external devices.

Referring to FIG. 1, the processing system 100 may include a client device 110 that is operatively connected to an enterprise network 150 via a public network 170. The client device may be a computing device such as a computer, a tablet, or a smart phone on which a user of the client device may have established an account. The user may log into the account by providing certain credentials (such as a matching pair of a user identifier and a password) associated with the user identifier. The client device 110 may further establish a secured communication channel with the enterprise network 150 via the public network 170 according to certain protocols.

The enterprise network 150 may include physical servers and/or virtual machines, raw and file-based storage, routers, firewalls, and/or load balancers interconnected by two or more LANs. As shown in FIG. 1, enterprise network 150 may include an internal network 160. In other implementations, enterprise network 150 may include various other network topologies, including two or more internal networks and/or one or more de-military zone (DMZ) networks.

Enterprise network 150 may further include an application server 120, an authentication server 130, and a directory server 140 interconnected via internal network 160. Directory server 140 is designed to provide distributed directory information services by storing an organized set of records representing various entities, including users, user groups, organizations, etc. In some implementations, directory server 140 may implement Lightweight Directory Access Protocol (LDAP).

A user of the client device 110 is identified by a user identifier. The user may, via the client device 110, request certain services (e.g., data services) from application server 120. However, prior to establishing a connection with the application server 120, the user of client device 110 needs to be authenticated by authentication server 130 in order to obtain the credentials necessary to access the services provided by application server 120. Authentication server 130 is shown as running on a dedicated hardware server. In other implementations authentication server 130 may be collocated with other functional components of enterprise network (e.g., with directory server 140).

In certain implementations, authentication server 130 may implement Kerberos authentication protocol designed to allow computer systems communicating over a non-secure network, such as the public network 170, to prove their identity to each other in a secure manner. In one implementation, the client device 110 and the authentication server 130 may prove their identity using password authenticated key encryption (PAKE) based on a secret (such as a password) known to the authentication server 130 to be associated with a user identifier (of a user) associated with the client device 110. Based on the shared secret, the client device 110 and the authentication server 130 may mutually solve a sophisticated mathematical problem and create a high entropy session key (K) that may be used to encrypt data stored in the tokens issued by the authentication server 130. For example, in the context of a Kerberos server, after establishing the session key (K) between the client device 110 and the authentication server 130, the session key (K) is used to encrypt data stored in a proof of authentication token (e.g., in the ticket issuing ticket in the context of Kerberos server) that may be used by the client device 110 to prove its identity to the application server 120 and receive services from the application server 120.

Although various implementations of PAKE (such as SPEKE and Diffie-Hellman encrypted key exchange (DH-EKE)) may establish a session key for data encryption without the need to transmit the secret shared between the client device 110 and the authentication server 130, the client device 110 and the authentication server 130 still need to exchange certain information over the public network 170. The exchange of information may allow an attacker to amount a brute force attack to the authentication server 130 or to the client device 110. Certain implementation of PAKE (such as SPEKE) has shown to have weaknesses that allow the attacker to attempt submission of multiple passwords in a single round trip with the authentication server 130 (or the client device 110). Therefore, there is a need to introduce one or more additional factors (such as a second factor and/or a third factor) in addition to the password ("first factor") associated with the user identifier to enhance the channel security between the client device 110 and the authentication server 130.

In one implementation, a second factor authentication server 135 may be operatively coupled to the authentication server 130. In one implementation, the second factor authentication server 135 may include a second factor authentication database storing second factor data (e.g., a one-time password (OTP) or biometric data of the user). The authentication server 130 may verify the second factor data associated with a user identifier received from the client device 110 with the second factor data stored by the second factor authentication database. In another implementation, the second factor authentication server 135 may be a stand-alone server that is operatively coupled to the authentication server 130 via the internal network 160. Upon receiving the second factor data associated with the user identifier from the client device 110, the authentication server 130 may transmit a request to the second factor authentication server 135 to retrieve the second factor data associated with the user identifier associated with the user identifier. The second factor authentication server 135 may, based on the request, provide the second factor data to the authentication server 130. In the event that authentication server 130 cannot authenticate a user identifier associated with the client device 110 based on either the first factor data (e.g., the password) or the second factor data (e.g., the OTP or biometric data), the authentication server 130 may issue a denial of authentication token to the client device 110. Because there are two factors involved in the authentication process, the brute force attacker does not know whether the guessed passwords are wrong or the second factor data is wrong. Thus, the user authentication process is less likely to overcome by brute force attacks.

In one implementation, instead of establishing an encrypted channel of communication between the client device 110 and the authentication server 130 based on a third party certificate, the authentication server 130 may establish an encryption session key between the client device 110 and the authentication server 130 based on a combination of first factor data (e.g., a password known by the authentication server 130 to be associated with a user identifier) and second factor data (e.g., a one-time password or biometric data). In response to establishing the encryption session key using both the first and second factor data, in one implementation, the client device 110 and the authentication server 130 may validate the encryption session key by exchanging verification data (e.g., a hash of a derived session key). In response to successfully validating the encryption session key, the authentication server 130 may issue a proof of authentication token to the client device 110. The proof of authentication token may include data encrypted with the session key. The client device 110 may then use the proof of authentication token to obtain services from the application server 120.

Figure 2:
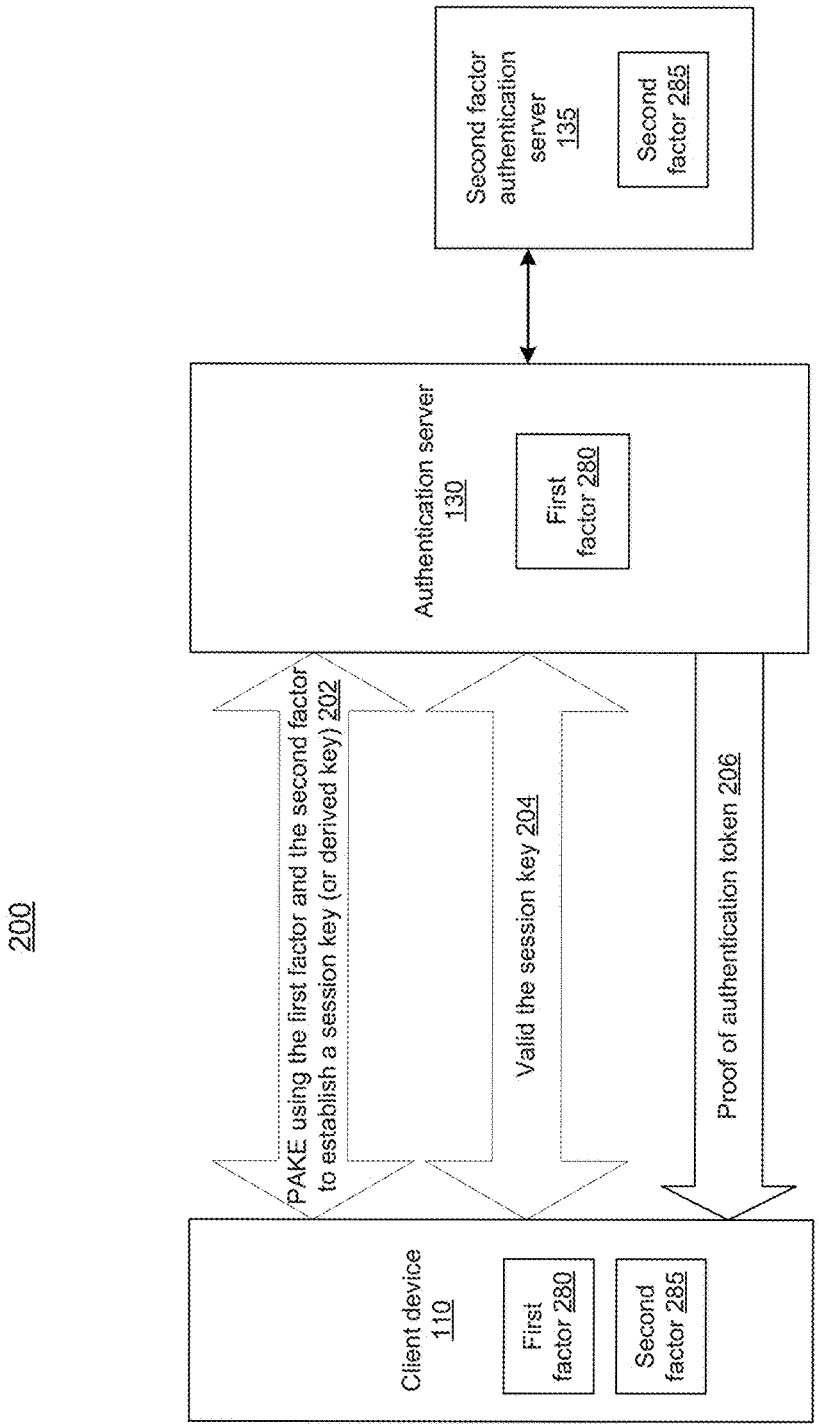
FIG. 2 illustrates a process for an authentication server to authenticate a client device according to an implementation of the present disclosure.

FIG. 2 illustrates a process to authenticate client device 110 associated with a user according to an implementation of the present disclosure. As shown in FIG. 2, client device 110 may have access to multi-factor data that may be used to authenticate the client device 110 (and the user associated with the client device 110) with the authentication server 130. In one implementation, client device 110 may include a storage device (not shown) to store first factor data 280 and second factor data 285 associated with a user identifier. A processing device associated with the client device 110 may retrieve the first factor data 280 and the second factor data 285 from the storage device. Similarly, a processing device associated with the authentication server 130 may retrieve the first factor data 280 from a storage associated with the authentication server 135 and the second factor data 285 stored in the second factor authentication server 135. The first factor data may be a password (e.g., the shared secret with the authentication server 130) that is also known to the authentication server 130. The password is private to the user associated with the user identifier, and similarly, in response to receiving the request from the client device 110 for certain services, the authentication server 130 may associate the password with the user identifier.

The second factor data 285 includes factor data other than the user password. For example, in one implementation, the second factor data 285 is a one-time password (OTP) that is valid for only one login session or valid for only a predetermined amount of time (e.g., updated every 60 seconds). The user of the client device 110 may receive the OTP through one or more communication channels that are independent from the public network 170 connecting the client device 110 and the authentication server 130, and enter the OTP to the client device 110 so that the OTP may be stored in the storage. For example, the user may receive the OTP via a text message, a token generator application running on a mobile phone, or proprietary tokens such as, for example, the RSA Security's SecurID token. The OTP may be a string of alphanumeric characters of suitable length (e.g., 6 character long). In one implementation, the OTP may be generated and sent to both the client device 110 and the authentication server 130 in a time-synchronized manner so that user of the client device 110 and the second factor authentication server 135 receive a same OTP at a given time instance, although the OTP may change over time in a time synchronized fashion.

In another implementation, the second factor data 285 may include biometric data associated with the user. For example, the second factor data 285 stored in client device 110 may include finger prints, face image, iris prints, or palm prints of the user, or any suitable biometric data that is capable of uniquely identifying the identity of the user. Correspondingly, the second authentication server 135 may also include storage to store the biometric second factor data. In one implementation, a hash value of biometric data is used as the second factor data rather than the raw biometric data. In one implementation, the second factor data may include a combination of different types of data. For example, the second factor data may include both the OTP and biometric data (e.g., finger prints of the user) that may be combined together for authenticating the client device 110.

Referring to FIG. 2, in one implementation, client device 110 and authentication server 130 may, at 202, use a the PAKE approach to establish a session key (K) based on a combination of the first factor data (e.g., the password) and the second factor data (e.g., the OTP or biometric data associated with the user). The PAKE approach may include any suitable type of PAKE approach such as, for example, the simple password exponential key exchange (SPEKE) approach.

In one implementation, at 204, the client device 110 and/or the authentication server 130 may further validate the session key (K) to enable a trust relationship between the client device 110 and the authentication server 130. In one implementation, to validate the session key (K), a derived session key (K') is generated using a key derivation technique on the client device 110 and on the authentication server 130. A hash value of the derived session key (K') may be exchanged between the client device 110 and the authentication server 130 to validate the derived session key (K').

In one implementation, in response to successfully validating the session key (K) (or the derived session key (K')), the authentication server 130 may issue a proof of authentication token to the client device 110. The proof of authentication token may include data encrypted using the session key (K) or the derived session key (K'), wherein the encrypted data enables the client device 110 to access the application server 120 and receive the requested services. However, if authentication server 130 is not able to either authenticate the session key (K) or validate the session key (K) (or the derived session key (K')), the authentication server 130 may issue a denial of authentication token to the client device 110.

Figure 3:
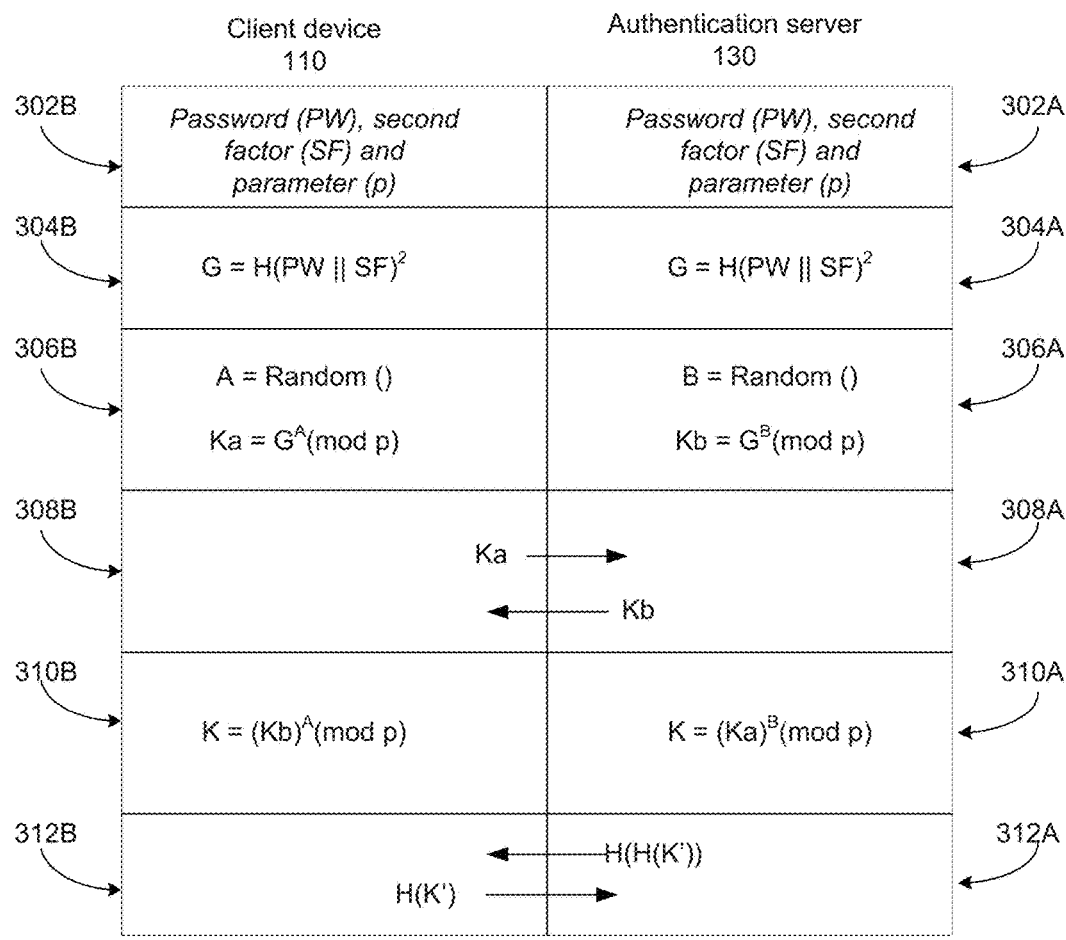
FIG. 3 illustrates a SPEKE method to establish a trusted session key (K) between a client device and an authentication server according to an implementation of the present disclosure.

In one implementation, a SPEKE approach is used to establish the session key based on a password of a user known to the authentication server 130 and a second factor data. FIG. 3 illustrates a SPEKE method 300 to establish a trusted session key (K) between the client device 110 and the authentication server 130 according to an implementation of the present disclosure. As shown in FIG. 3, the right column depicts steps 302A-312A that a processing device of the authentication server 130 performs, and correspondingly, the left column depicts steps 302B-312B that a processing device of the client device 110 performs.

In one implementation, the authentication server 130 and the client device 110 may already share certain information and data about the user using the client device 110. Therefore, the authentication server 130 and the client device 110 may retrieve the shared data and information at 302A, 302B. The shared data and information may have acquired by the client device 110 and the authentication server 130 through channels other than the public network 170. In one implementation of the SPEKE, the client device 110 and the authentication server 130 may share first factor data (e.g., a password (PW)) of the user, second factor data (SF) that is independent from the first factor data (e.g., a OTP), and a prime number (p). In one implementation, the first factor data is the password including a string of alphanumeric characters (or alphabets and digits). The password may have been established by the user when the user registers the account with the authentication server 130. The second factor data is an OTP that the user, and the authentication server 130 receives from security token generation devices. The prime number (p) may be any prime number (e.g. a four-digit prime number) to increase the difficulty of the mathematical problem to be solved by the client device 110 and the authentication server 130. In one implementation, the prime number may be selected from a group of numbers. In another implementation, the prime number may be selected by using a random number generator to select a prime random number within a certain range.

At 304A, 30B, the client device 110 and the authentication server 130 may, respectively, construct a generator value (G) using the first factor data and the second factor data. In one implementation, to construct the generator value (G), a processing device of the authentication server 130 may combine the password (PW) of the user with the second factor data (SF). In one implementation, the processing device of the authentication server 130 may concatenate the alphanumeric string of password (PW) with the alphanumeric string of an OTP. In another implementation, the password (PW) and the second factor data (SF) may be combined according to the following representation (H(PW) XOR H(SF))$^2$, wherein H(*) represents a hash function, and XOR represents the Xor operator. The processing device of the authentication server 130 may compute a hash value (H) for the combination of the password (PW) and the second factor (SF) using a hash generation technique. For example, the hash value (H) may be generated by looking up a hash table associated with authentication server 130. Then, the processing device of the authentication server 130 may compute a generator value (G) by computing a square value of the hash value (H). In one implementation, a processing device of the client device 110 may perform similar procedures to independently compute the generator value (G).

At 306A, 306B, the client device 110 and the authentication server 130 may, respectively, each compute a private and public key pair (A, Ka) or (B, Kb). In one implementation, at 306A, the processing device of the authentication server 130 may compute a first random number (B) using random number generator value (Random( )), and a public key (Kb) according to Kb=G$^B$(mod p), wherein G is the generator value, B is the random number (or the private key private to the authentication server 130), mod is the modulus operator, and p is the prime number shared with the client device 110. Similarly, at 306B, the processing device of the client device 110 may independently compute a random number (A) (or the private key to the client device 110) and a public key (Ka) according to Ka=G$^A$ (mod p), wherein G is the generator value, A is the random number (or the private key private to the client device 110), mod is the modulus operator, and p is the prime number shared with the authentication server 130.

In one implementation, to establish a session key (K) for the client device 110 and the authentication server 130, the client device 110 and the authentication server exchange the public keys (Ka, Kb) over the public network 170. At 308A, the authentication server 130 may transmit the public key Kb to the client device 110 over the public network, and similarly, at 308B, the client device 110 may transmit the public key Ka to the authentication server over the public network. In one implementation, an Internet transport protocol may specify how the public keys are exchanged. Because the public keys are generated based on two factors, the weakness of SPEKE is mitigated. For example, even if the attacker initiates a brute force attack to the authentication server 130 by correctly guessing the password (PW), the attacker still does not know the second factor (SF) and cannot acquire the session key (K) that was generated based on both the first and second factor data. Additionally, the attacker cannot determine that the first factor attack was correct or not. Even if the attacker guesses the first factor correctly, the attacker has no verification that the guess was correct.

At 310A, 310B, the client device 110 and the authentication server 130 may, respectively, compute the session key (K) based on the received public keys and their own private keys. In one implementation, at 310A, the processing device of the authentication server 130 may compute the session key (K) according to K=(Ka)$^B$ (mod p) that is equivalent to G$^{BA}$ (mod p), and similarly, at 310B, the processing device of the client device 110 may compute the session key (K) according to K=(Kb)$^A$(mod p) that is equivalent to G$^{BA}$ (mod p). Thus, the client device 110 and the authentication server 130 may each establish a same session key (K) over the public network without the need to exchange the password (PW) or relying on security certificates.

In one implementation, the authentication server 130 may be part of a Kerberos server to authenticate a user of the client device 110 for certain services at the application server 130. Thus, the session key (K) may be the session key for the authentication server according to the Kerberos protocol. In one implementation, at 312A, 312B, the authentication may further include validating the session key (K) by both the client device 110 and the authentication server 130. The validation may be carried out in any suitable validation approaches. In one implementation, at 312A, the authentication server 130 may initiate the validation by compute a derived session key (K') from the session key (K) using a key derivation function (KDF). The key derivation function may be a type of suitable KDFs including, for example, key stretching and key strengthening schemes. The processing device of the authentication server 130 may then compute a hash of a hash of the derived session key (K') using a suitable hash function that is known to both the authentication server 130 and the client device 110. The authentication server 130 may then transmit the twice hashed value H(H(K')) of the derived session key (K') to the client device 110. Since the client device 110 can also generate the derived session key (K') based on its own copy of the session key (K), client device 110 may validate the H(H(K')) received from the authentication server 130 with the hash of its own copy of the session key (K). In return, at 312B, the processing device of the client device 110 may compute a derived session key (K') using the KDF based on the session key (K) and compute a hash value H(K') for the derived session key (K'). The client device 110 may then transmit the hash value H(K') to the authentication server 130 that may validate the H(K') received from the client device 110 with the hash value of its own copy of the session key (K).

In another implementation, the processing device of the server 130 and the processing device of the client device 110 can each encrypt certain knowledge value and validate the session key (K) based on the encrypted knowledge value. For example, the processing device of the client device 110 may execute a random number generator to generate a random number (R1) and the derived session key (K') using a hash function, and the processing device of the server 130 may execute a random number generator to generate a random number (R2) and the derived session key (K'). The processing device of the client device 110 may encrypt R1 with K' and transmit the encrypted value E$_{K'}$(R1) to the server 130. The server 130 may then decrypt E$_{K'}$(R1) to deduce R1 with its own K' and combine the R1 and R2 (e.g., cascading R1 and R2 or R1∥R2). The server 130 may encrypt the combination of R1 and R2 and transmit the encrypted combined value E$_{K'}$(R1∥R2) back to the client device 110.

The client device 110 may then decrypt $E_K(R1\|R2)$ and derive R2. The client device 110 may then encrypt R2 with the derived session key K' and transmit $E_{K'}(R2)$ to the server 130. The server 130 may determine the validity of the session key K based on the received $E_{K'}(R2)$. For example, the server 130 may decrypt $E_{K'}(R2)$ and compare with the stored R2. If they match, the session key (K) is validated. If they do not match, the session key (K) is not validated.

In one implementation, in response to successfully validating session key (K), the authentication server 130 may issue the proof of authentication token to the client device 110. The proof of authentication token may include service ticket encrypted with the session key (K). The client device 110 may use the proof of authentication token to show authenticity to application server 120 and receive services from application server 120. Thus, the client device 110 may establish authentication with the enterprise network 150 without the need to provide a security certificate issued by a third party.

Figure 4:
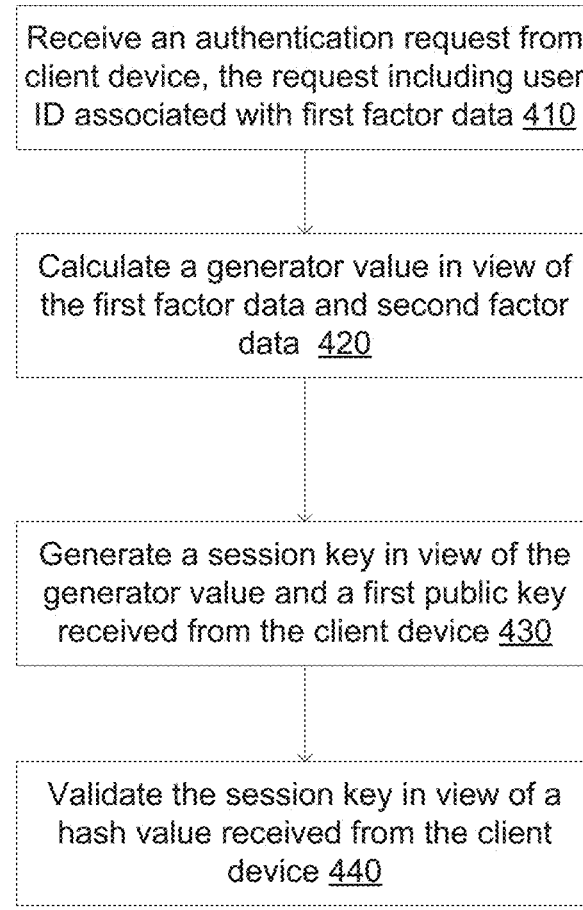
FIG. 4 a flow diagram illustrating a method to authenticate a client device according to an implementation of the present disclosure.

FIG. 4 is a flow diagram illustrating a method 400 to authenticate a client device according to some implementations of the disclosure. The method 400 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media. In one implementation, the methods may be performed by the processing device of authentication server 130 or the processing device of client device 110 as shown in FIGS. 1 and 2.

Referring to FIG. 4, at 410, the processing logic may receive an authentication request from a client device. The authentication request may include a request to access an application server for receiving certain services (e.g., a web service) at the application server. The request may include a user identifier to identify a user associated with the client device. The processing logic may be part of an authentication server authenticating users on behalf of one or more application servers. The processing logic may identify and retrieve, from storage devices, a first factor data and a second factor data associated with the user identifier. In one implementation, the first factor data may be a password of the user, and the second factor data may be a one-time password (OTP) that is generated independently from the first factor data.

At 420, the processing logic may compute a generator value based on a combination of the first factor data and the second factor data. In one implementation, the processing logic may concatenate the user password with the OTP, and compute a square value of a hash of the combination of the password with the OTP as the generator value. In another implementation, the combination may include calculating an XOR of the first factor data and the second factor data.

At 430, the processing logic may further receive a public key from the client device. The first public key may have been computed by the client device using the first factor data and second factor data known to the client device. The processing logic of the authentication server may then use the public key to generate a session key for the authentication server. In one implementation, the processing logic may compute the session key based on the generator value (G), the received public key (Ka), and a prime number (p) according to $(Ka)^B \pmod{p}$.

At 440, the processing logic may further validate the session key. The validation can be any suitable method. For example, to validate the session key, the processing logic of the authentication server may receive a twice hashed value from the client device. The received value is purported to be the twice hashed value of a derived session key symmetrically generated and derived at the client device. The processing logic may compute a derived session key and its hash value based on its own copy of the session key, and then the processing logic may compare the computed hash value with the received hash value to determine whether the session key is valid. In response to determining that the session key is valid, the processing logic may issue a proof of authentication token to the client device to enable the client device receive services from the application server. In response to determining that the session key is invalid, the processing logic may issue a denial-of-authentication token to the client device.

Figure 5:
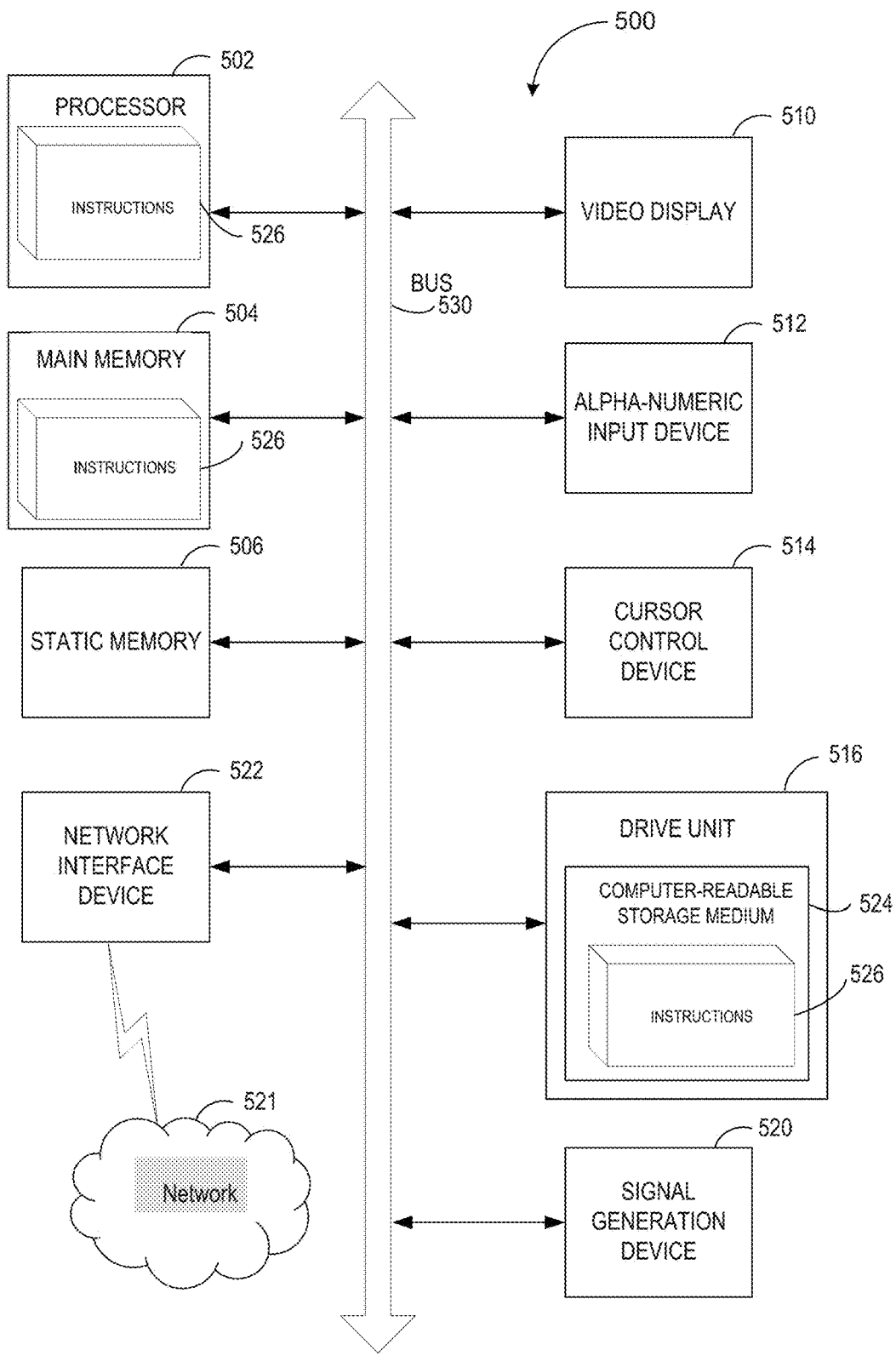
FIG. 5 is a block diagram illustrating an exemplary computer system according to an implementation of the present disclosure.

FIG. 5 illustrates a diagrammatic representation of a machine in the exemplary form of a computer system 500 within which a set of instructions for causing the machine to perform any one or more of the methodologies discussed herein may be executed. In alternative implementations, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets.

The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 522. The computer system 500 also may include a video display unit 510 (e.g., a liquid crystal display (LCD), a cathode ray tube (CRT), or a touch screen), an alphanumeric input device 512 (e.g., a keyboard), a cursor control device 514 (e.g., a mouse), and a signal generation device 520 (e.g., a speaker).

The data storage device 518 may include a computer-readable storage medium 524 on which is stored one or more sets of instructions 526 (e.g., software) embodying any one or more of the methodologies or functions described herein (e.g., instructions of the routing application 122). The instructions 526 may also reside, completely or at least partially, within the main memory 504 and/or within the processor 502 during execution thereof by the computer system 500, the main memory 504 and the processor 502 also constituting computer-readable storage media. The instructions 526 may further be transmitted or received over a network 574 via the network interface device 522.

While the computer-readable storage medium 524 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "enabling", "identifying," "selecting," "displaying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   receiving, by a processing device of an authentication server over a public network, an authentication request and a first public key from a client device, wherein the first public key generated by the client device, and wherein the authentication request comprising:

a user identifier;
first factor data associated with the user identifier, wherein the first factor data comprises a password, and wherein the password is stored in a storage associated with the authentication server prior to receiving the authentication request; and
second factor data associated with the user identifier, wherein the second factor data comprises one of:
a one-time password, wherein the one-time password is different than the password; or
biometric data; and
generating a session key that is a function of a combination of the first factor data, the second factor data, and the first public key received from the client device, wherein the combination comprises determining a generator value by:
combining the first factor data with the second factor data to generate a combined value, wherein combining comprises one of concatenating the first factor data with the second factor data or calculating an exclusive-OR of the first factor data and the second factor data; and
calculating a hash value of the combined value.

2. The method of claim 1, further comprising:
receiving a first twice-hashed value from the client device;
generating a derived session key in view of the session key;
calculating a second hash value of the derived session key; and validating the second hash value in view of the first twice-hashed value received from the client device.

3. The method of claim 2, further comprising:
in response to successfully validating the second hash value with the first twice-hashed value, issuing a proof of authentication token to the client device.

4. The method of claim 3, wherein the proof of authentication token is issued without requiring using a security certificate.

5. The method of claim 2, further comprising:
in response to failing to validate the second hash value with the first hash value, issuing a denial-of-authentication token to the client device.

6. The method of claim 1, wherein the one-time password is valid for one of a pre-determined period of time or a pre-determined count according to a counter.

7. The method of claim 1, further comprising:
generating a random number;
generating a second public key in view of the generator value and the random number; and
transmitting the second public key to the client device.

8. The method of claim 1, wherein a processing device of the client device is to:
calculate a second generator value in view of a combination of the first factor data and the second factor data;
generate a second random number;
generate the first public key in view of the second generator value and the second random number; and
transmit the first public key to the authentication server.

9. A non-transitory machine-readable storage medium storing instructions which, when executed, cause a processing device to:
receive, by the processing device of an authentication server over a public network, an authentication request and a first public key from a client device, wherein the first public key generated by the client device, and wherein the authentication request comprising:
a user identifier;
first factor data associated with the user identifier, wherein the first factor data comprises a password, and wherein the password is stored in a storage associated with the authentication server prior to receiving the authentication request; and
second factor data associated with the user identifier, wherein the second factor data comprises one of:
a one-time password, wherein the one-time password is different than the password; or
biometric data; and
generate a session key that is a function of a combination of the first factor data, the second factor data, and the first public key received from the client device, wherein the combination comprises determining a generator value by:
combine, by the processing device of an authentication server over a public network, the first factor data with the second factor data to generate a combined value, wherein combining comprises one of concatenating the first factor data with the second factor data or calculating an exclusive-OR of the first factor data and the second factor data; and
calculate a hash value of the combined value.

10. The non-transitory machine-readable storage medium of claim 9, wherein the processing device is further to:
receive a first twice-hashed value from the client device;
generate a derived session key in view of the session key;
calculate a second hash value of the derived session key; and
validate the second hash value in view of the first twice-hashed value received from the client device.

11. The non-transitory machine-readable storage medium of claim 10, wherein the processing device is further to:
in response to successfully validating the second hash value with the first twice-hashed value, issue a proof of authentication token to the client device.

12. The non-transitory machine-readable storage medium of claim 9, wherein the one-time password is valid for one of a pre-determined period of time or a pre-determined count according to a counter.

13. A server, comprising:
a memory to store a first factor data and a second factor data; and
a processing device, operatively coupled to the memory, the processing device to:
receive, over a public network, an authentication request and a first public key from a client device, wherein the first public key generated by the client device, and wherein the authentication request comprising:
a user identifier;
first factor data associated with the user identifier, wherein the first factor data comprises a password, and wherein the password is stored in the memory prior to receiving the authentication request; and
second factor data associated with the user identifier, wherein the second factor data comprises one of:
a one-time password, wherein the one-time password is different than the password; or
biometric data; and
generate a session key that is a function of a combination of the first factor data, the second factor data, and the first public key received from the client device, wherein the combination comprises determining a generator value by:
combine, by the processing device of an authentication server over a public network, the first factor data with the second factor data to generate a combined value, wherein combining comprises one of concatenating the first factor data with the second factor data or calculating an exclusive-OR of the first factor data and the second factor data; and calculate a hash value of the combined value.

14. The server of claim 13, wherein the processing device is further to:

receive a first twice-hashed value from the client device, generate a derived session key in view of the session key, calculate a second hash value of the derived session key, and validate the second hash value in view of the first twice-hashed value received from the client device.

15. The server of claim 14, wherein the processing device is further to:

in response to successfully validating the second hash value with the first twice hashed value, issue a proof of authentication token to the client device.

16. The server of claim 14, wherein the processing device is further to:

in response to failing to validate the second hash value with the first hash value, issue a denial-of-authentication token to the client device.

17. The server of claim 13, wherein the one-time password is valid for one of a pre-determined period of time or a pre-determined count according to a counter.

* * * * *